United States Patent
Boeckman et al.

(10) Patent No.: US 8,381,363 B2
(45) Date of Patent: Feb. 26, 2013

(54) SECURING MECHANISM FOR SHACKLE

(75) Inventors: Paul A. Boeckman, Tulsa, OK (US);
Roger E. Beall, Mounds, OK (US);
Chris Whitehead, Spring, TX (US)

(73) Assignee: The Crosby Group LLC, Tulsa, OK (US)

( * ) Notice: Subject to any disclaimer, the term of this patent is extended or adjusted under 35 U.S.C. 154(b) by 45 days.

(21) Appl. No.: 12/890,967

(22) Filed: Sep. 27, 2010

(65) Prior Publication Data
US 2012/0073088 A1 Mar. 29, 2012

(51) Int. Cl.
*F16G 11/09* (2006.01)

(52) U.S. Cl. ......... 24/132 WL; 24/16 R; 24/20 LS; 24/20 R; 24/21; 24/24; 24/28; 411/317; 411/351; 411/353; 411/519; 411/521; 411/530

(58) Field of Classification Search ......... 24/132 WL, 24/20 LS, 16 R, 20 R, 21, 24, 28; 411/317, 411/351, 353, 519, 521, 530
See application file for complete search history.

(56) References Cited

U.S. PATENT DOCUMENTS

| 429,461 | A | | 6/1890 | Mandt | |
|---|---|---|---|---|---|
| 1,652,272 | A | * | 12/1927 | Dawson | 411/519 |
| 2,124,912 | A | * | 7/1938 | Ehmann | 59/86 |
| 2,417,741 | A | | 3/1947 | Dillon | |
| 2,449,795 | A | | 9/1948 | Stillwagon | |
| 2,574,034 | A | * | 11/1951 | Heimann | 411/521 |
| 2,654,629 | A | * | 10/1953 | Renfroe | 294/101 |
| 3,115,355 | A | * | 12/1963 | Gardner | 403/318 |
| 3,307,871 | A | * | 3/1967 | Russell et al. | 294/86.4 |
| 3,337,256 | A | * | 8/1967 | Shropshire, Jr. | 294/82.1 |
| 3,609,826 | A | | 10/1971 | Seabourn | |
| 3,638,980 | A | * | 2/1972 | Kleinhenn | 411/320 |
| 3,656,293 | A | * | 4/1972 | Lowery, Sr. | 59/86 |
| 3,787,134 | A | | 1/1974 | Burr | |
| 3,966,240 | A | | 6/1976 | Enomoto | |
| 4,113,397 | A | | 9/1978 | Snyder | |
| 4,221,252 | A | | 9/1980 | Bruce | |
| 4,337,614 | A | | 7/1982 | Briscoe | |
| 4,639,979 | A | | 2/1987 | Polson | |
| 4,936,612 | A | * | 6/1990 | Kohn | 292/327 |
| 4,971,318 | A | * | 11/1990 | Tracy | 482/107 |
| 5,046,881 | A | | 9/1991 | Swager | |
| 5,330,233 | A | * | 7/1994 | Kress | 285/9.2 |

(Continued)

FOREIGN PATENT DOCUMENTS

| DE | 9101732 | 6/1992 |
|---|---|---|
| GB | 1496357 | 12/1977 |

*Primary Examiner* — Robert J Sandy
*Assistant Examiner* — David Upchurch
(74) *Attorney, Agent, or Firm* — Head, Johnson & Kachigian, P.C.

(57) ABSTRACT

A securing mechanism for a shackle having a pair of opposed legs with an opening at one end of each of the pair of opposed legs to form a pair of opposed openings. The securing mechanism includes a shackle bolt having a head at one end and a circumferential groove near an opposed end wherein the shackle bolt is received through the pair of opposed openings in the shackle. A two piece hinged clamp assembly is received in the circumferential groove in order to retain the shackle bolt in the shackle. A retainer pin is received in an opening in the two piece clamp assembly to hold the two piece clamp assembly in a closed position. A retainer clip surrounds the retainer pin. A lock pin through the two piece clamp assembly retains the retainer pin in the two piece clamp.

6 Claims, 5 Drawing Sheets

U.S. PATENT DOCUMENTS

| | | | |
|---|---|---|---|
| 5,391,133 A | 2/1995 | Ruffa | |
| 5,393,162 A * | 2/1995 | Nissen | 403/154 |
| 5,597,260 A | 1/1997 | Peterson | |
| 5,865,557 A * | 2/1999 | Kasim | 403/79 |
| 6,023,927 A | 2/2000 | Epstein | |
| 6,464,268 B1 | 10/2002 | Hough et al. | |
| 6,533,333 B1 | 3/2003 | Radzik | |
| 6,568,894 B2 * | 5/2003 | Golden et al. | 411/351 |
| 6,789,384 B2 * | 9/2004 | Hungerford | 59/93 |
| 6,953,212 B2 | 10/2005 | Alba | |
| 7,000,905 B1 | 2/2006 | Lutter et al. | |
| 7,111,876 B2 * | 9/2006 | Hayashi et al. | 285/415 |
| 7,293,763 B2 | 11/2007 | Lutter et al. | |
| 7,384,078 B2 | 6/2008 | Cobb et al. | |
| 7,393,033 B1 | 7/2008 | Bisso, IV | |
| 7,540,140 B1 * | 6/2009 | Diaz et al. | 59/86 |
| 7,614,209 B1 | 11/2009 | Payne et al. | |
| 2005/0117989 A1 * | 6/2005 | Ewles | 410/77 |
| 2005/0276658 A1 * | 12/2005 | Silva | 403/154 |

\* cited by examiner

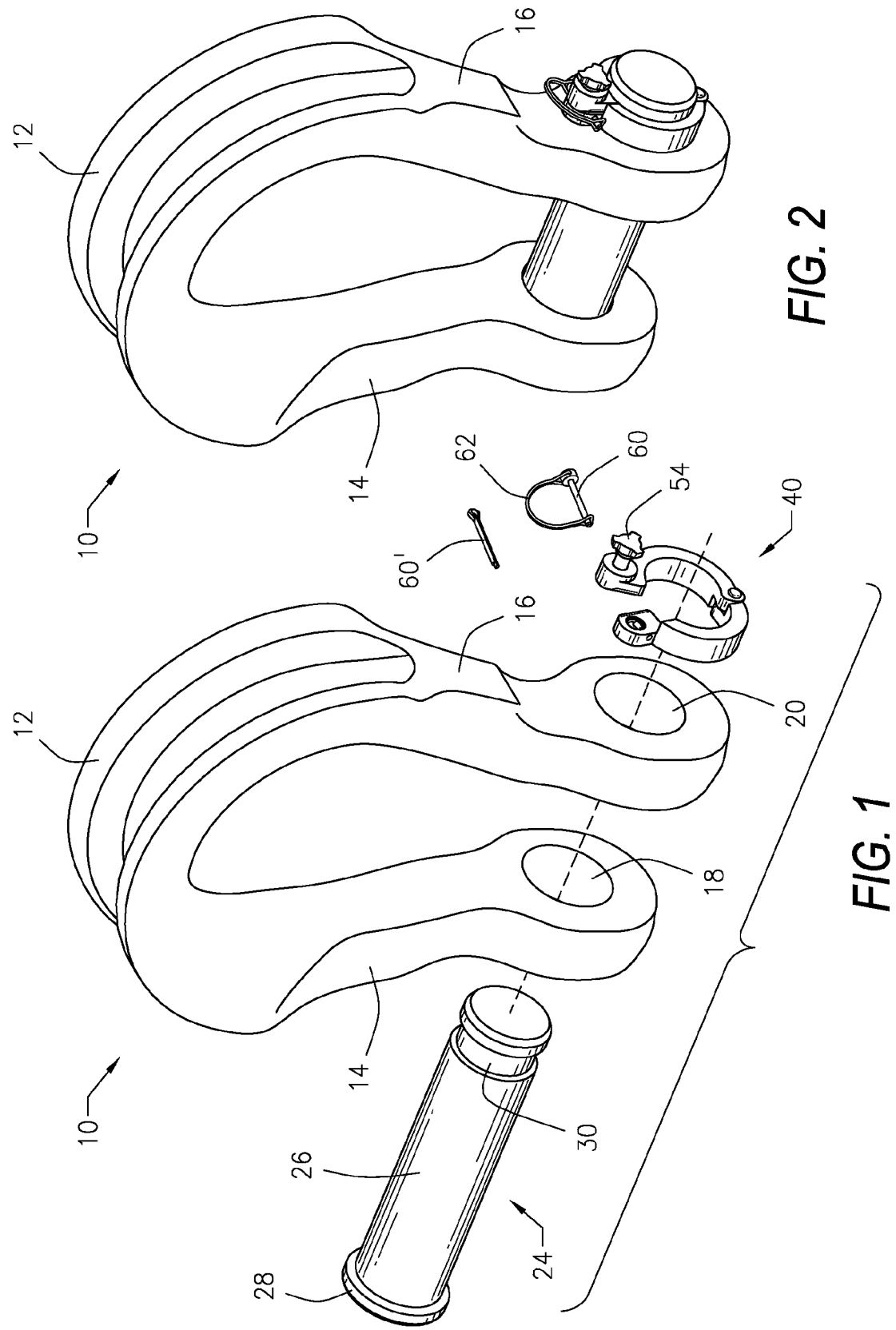

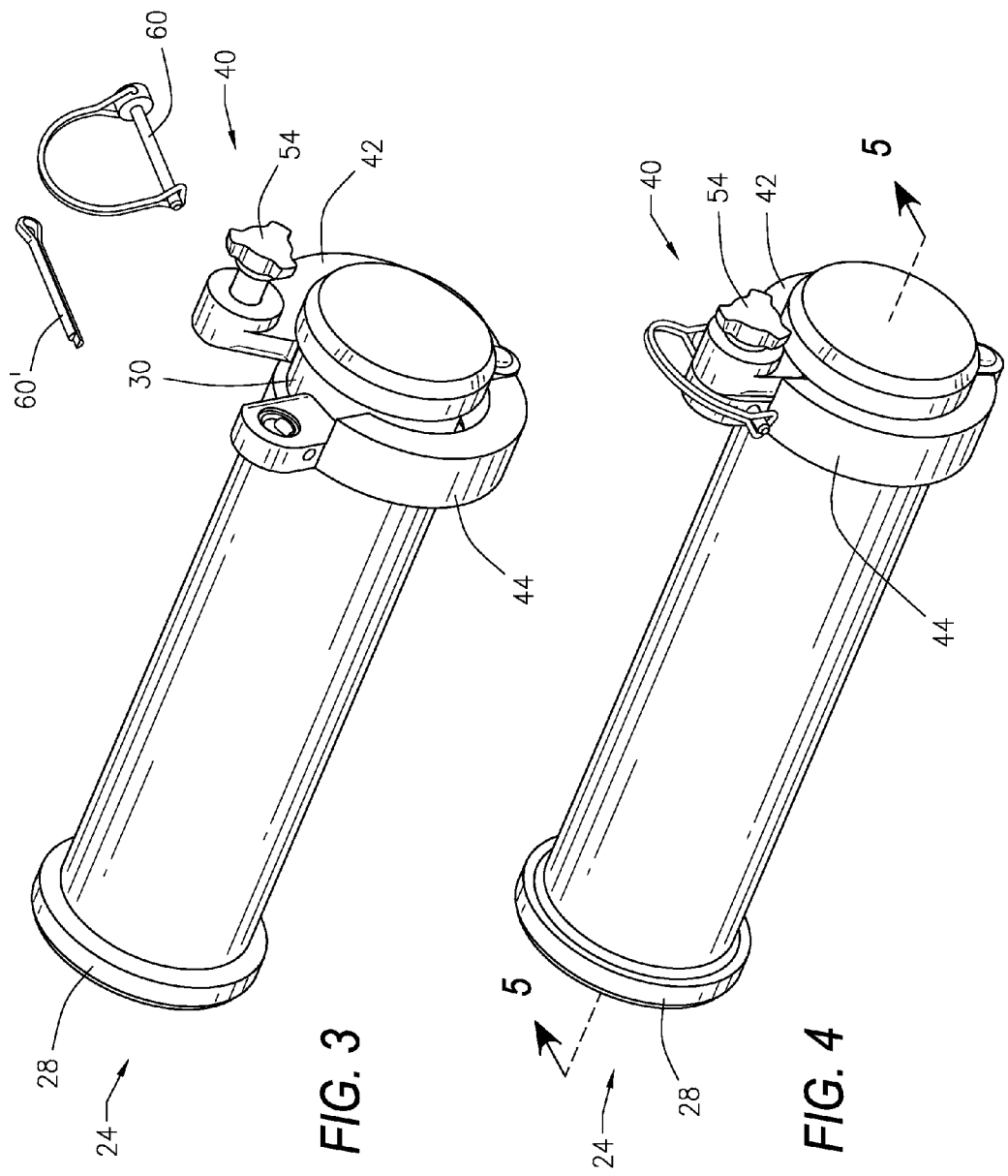

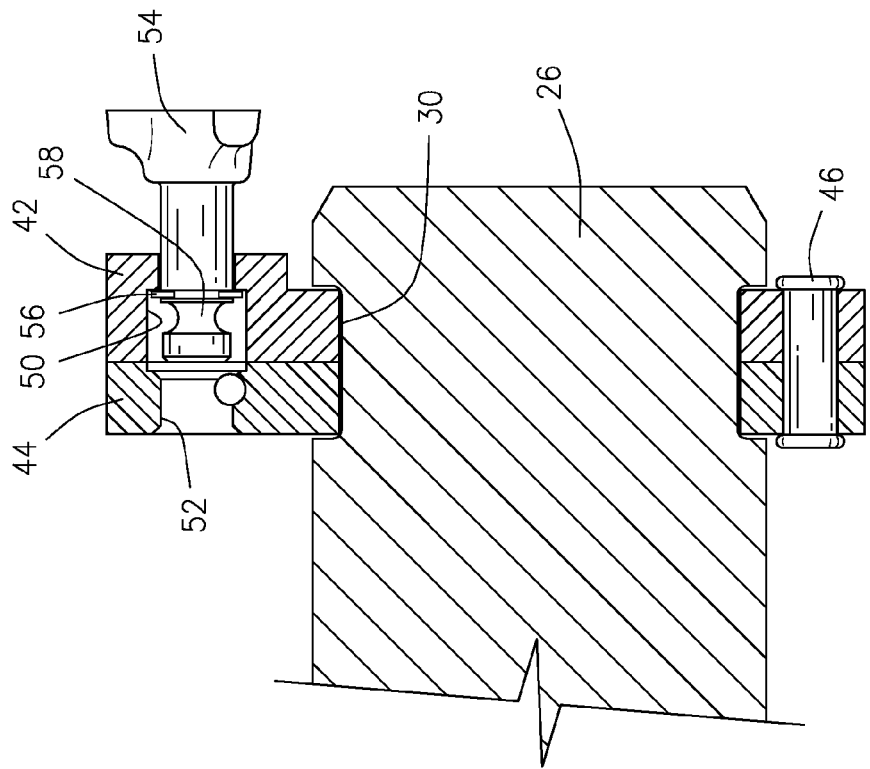
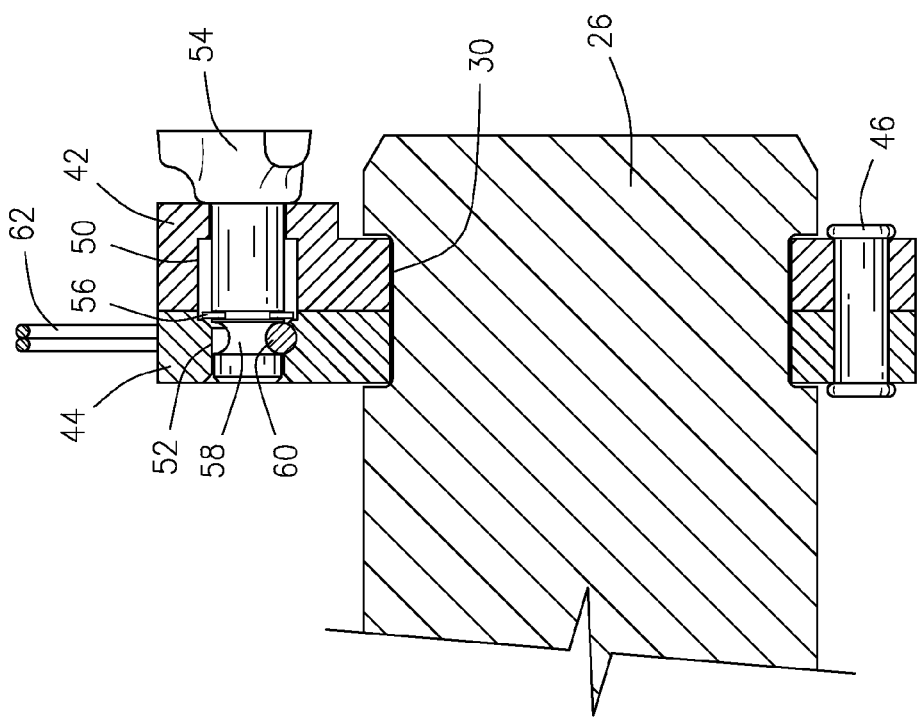
FIG. 5A
FIG. 5B

SECURING MECHANISM FOR SHACKLE

BACKGROUND OF THE INVENTION

1. Field of the Invention

The present invention is directed to a securing apparatus for a shackle and to a method for securing a shackle bolt to a shackle. In particular, the present invention is directed to an apparatus and a method of securing a shackle bolt to a shackle utilizing a hinged split nut providing both easy installation and removal of the shackle bolt.

2. Description of the Related Art

A shackle is one type of known device used to join sling cables or ropes together or used to connect a cable or rope to a load. Among the many applications for shackles are tie down, towing, suspension or lifting applications.

Presently, the securing mechanism utilized is typically either a screw pin type, which is received in a threaded opening, or a bolt type anchor along with a threaded nut and a cotter pin. In order to disassemble, the cotter pin must be removed from the shackle bolt and then the nut must be unthreaded from the shackle bolt. The screw pin shackles require one of the legs of the shackle to be threaded. In either type, there is a possibility of over tightening the threads. In the screw pin type, the shackle bolt is rigidly locked in place with the shackle.

In the past, various types of securing mechanisms for shackles have been proposed. Examples include Epstein (U.S. Pat. No. 6,023,927), Briscoe (U.S. Pat. No. 4,221,252), and Peterson (U.S. Pat. No. 5,597,260).

Additionally, various types of pipe clamps have been proposed which provide a sealed joint, such as Enomoto (U.S. Pat. No. 3,966,240), Stillwagon (U.S. Pat. No. 2,449,795), and Seabourn (U.S. Pat. No. 3,609,826).

It would be desirable to provide a securing mechanism for a shackle bolt for a shackle which is installable and removable using only small hand tools without requirement of any power tools.

It would also be desirable to provide a shackle bolt securing mechanism for a shackle which is easily installable and easily removable.

It would also be desirable to provide a shackle bolt securing mechanism for a shackle which does not require threading of either the shackle bolt or the shackle.

It would also be desirable to provide a shackle bolt securing mechanism for a shackle wherein the securing mechanism does not lock the shackle bolt in place with the shackle.

Accordingly, it is a principal object and purpose of the present invention to provide a securing mechanism for a shackle bolt for a shackle which eliminates any need for threads and eliminates any rotation of a bolt or nut in order to install and remove.

It is a further object and purpose of the present invention to provide a hinged split clamp to retain the shackle bolt on the shackle instead of threads in order to resist axial load.

It is a further object and purpose of the present invention to provide a hinged two piece clamp assembly to allow easy removal and installation of the bolt securing mechanism or retaining device.

It is a further object and purpose of the present invention to provide a securing mechanism for a shackle wherein the shackle bolt is not locked to the shackle.

SUMMARY OF THE INVENTION

The present invention is directed to a securing mechanism for a shackle having a body and a pair of opposed legs extending from the body. Each of the legs includes an opening to form a pair of opposed openings. A clevis pin or shackle bolt is received in and through the opposed openings. The shackle bolt at one end has an enlarged head larger than the diameter of the bolt. The shackle bolt also has a circumferential or annular groove around the circumference near an end opposed to the head.

A two piece clamp assembly or hinged split nut is received around and within the circumferential groove of the shackle bolt in order to secure the shackle bolt with the shackle.

In one preferred embodiment, the two piece clamp assembly includes an arcuate face ring and an arcuate back ring which are hingedly connected with a hinge pin. The face ring and the back ring each include an aperture which align together in the closed position to form an opening in the two piece clamp assembly to receive a retainer pin.

The retainer pin includes a transverse recess which aligns with an opening in the back face of the two piece clamp assembly to receive a lock pin in order to retain the retainer pin in the two piece clamp assembly.

BRIEF DESCRIPTION OF THE DRAWINGS

FIGS. 1 and 2 illustrate perspective views of a securing mechanism for a shackle with FIG. 1 illustrating an exploded view and FIG. 2 illustrating a fully assembled view constructed in accordance with present invention;

FIGS. 3 and 4 illustrate perspective views of a shackle bolt and a two piece clamp assembly of the securing mechanism shown in FIGS. 1 and 2;

FIGS. 5A and 5B are sectional views of alternate positions taken along section line 5-5 of FIG. 4;

DETAILED DESCRIPTION OF THE INVENTION

Figure 6:
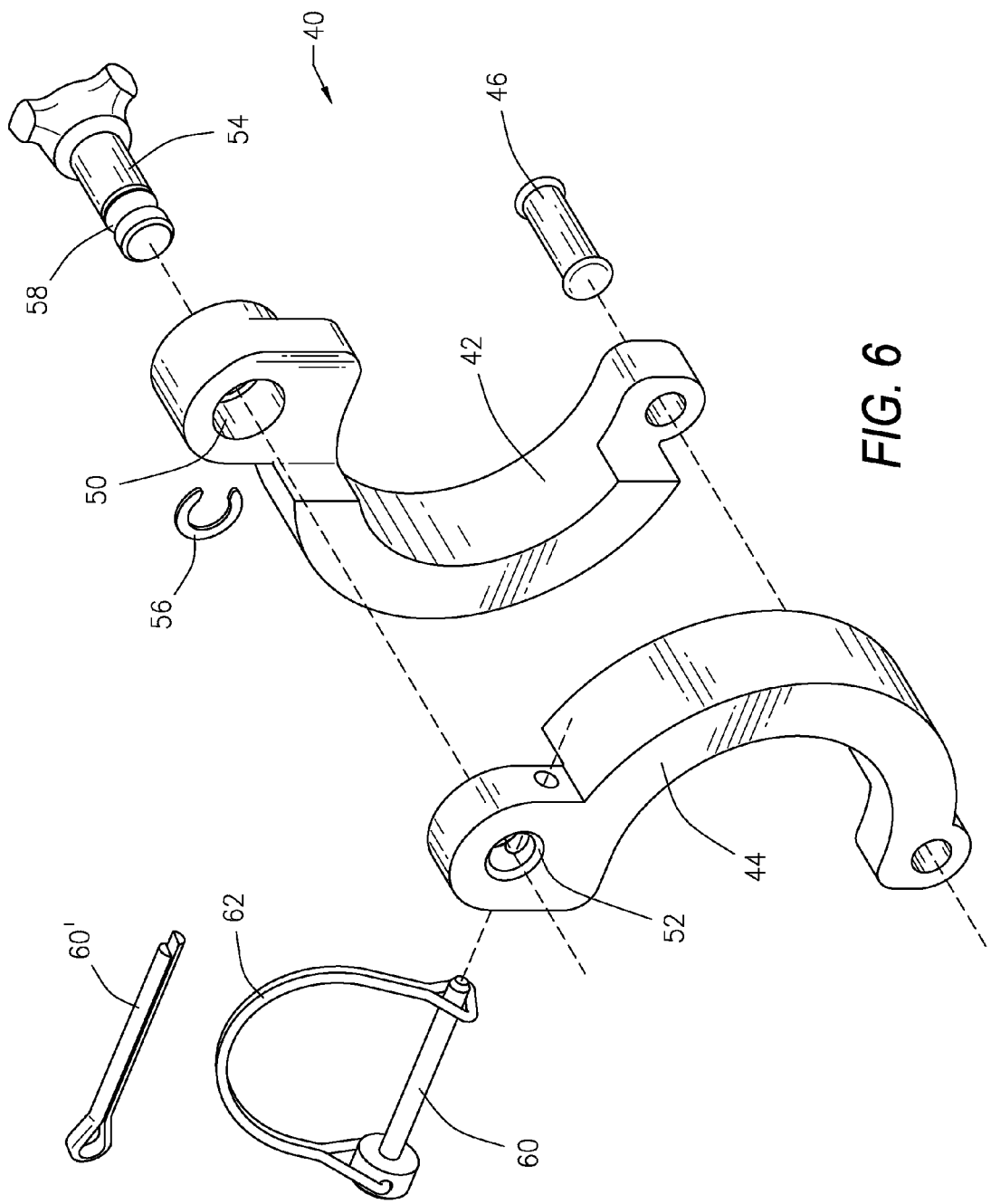
FIG. 6 illustrates an exploded view of the two piece clamp assembly of the present invention.

Referring to the drawings in detail, FIG. 1 illustrates an exploded view and FIG. 2 illustrates a fully assembled view of a shackle 10 having a body 12 and a pair of opposed clevis ears or legs 14 and 16 extending from the body 12. It will be appreciated that the shackle body and the ears or legs may take various configurations within the spirit and scope of the present invention.

Each of the legs 14 and 16 has an opening 18 and 20, respectively, to form a pair of opposed aligned openings 18 and 20.

A clevis pin or shackle bolt 24 has a cylindrical body having an external diameter slightly less than the diameter of the opposed leg openings 18 and 20. Accordingly, the shackle bolt 24 may be received in and through the openings 18 and 20. The shackle bolt 24 has an enlarged head 28 larger than the diameter of the cylindrical body at one end.

The shackle 10, the shackle bolt 24 and other elements may be fabricated from carbon steel or alloy steel, although other materials are possible within the spirit and scope of the invention.

The shackle bolt 24 also includes a circumferential or annular groove 30 around the circumference near an end opposed to the head 28. The circumferential groove 30 has a reduced diameter from the diameter of the shackle bolt 24 and may be easily journaled or machined into the shackle bolt.

In order to install, the axis of the shackle bolt (shown by dashed lines in FIG. 1) is aligned with the axis of the leg openings 18 and 20. When the shackle bolt 24 is received through the opposed leg openings 18 and 20, the shackle bolt 24 extends through the opposed openings 18 and 20 so that the circumferential groove 30 is accessible.

As will be explained in detail, a hinged split nut or two piece clamp assembly 40 is received within the circumferential groove 30 around the shackle bolt 24 in order secure the shackle bolt 24 with and to the shackle 10. The width of the circumferential groove 30 is slightly larger than the width of the two piece clamp assembly 40. Accordingly, the clamp assembly 40 will reside in the groove 30 yet will not move laterally. Additionally, the external diameter of the clamp assembly is larger than the diameter of the leg openings 18 and 20. Once the clamp assembly is secured in place, the shackle bolt may not be retracted.

FIGS. 3 and 4 illustrate perspective views of the shackle bolt 24 and the two piece clamp assembly 40 apart from the shackle itself for clarity and ease of description. FIG. 3 illustrates the two piece clamp assembly 40 partially installed or partially disassembled while FIG. 4 illustrates the two piece clamp assembly 40 fully installed on the shackle bolt 24.

FIGS. 5A and 5B are sectional views of alternative positions of the clamp assembly taken through section line 5-5 of FIG. 4.

FIG. 6 illustrates the two piece clamp assembly 40 apart from the shackle bolt and exploded. The two piece clamp assembly 40 includes an arcuate face element or ring 42 and an arcuate back element or ring 44. The face ring 42 and the back ring 44 are hingedly connected at one end with a hinge pin 46. The hinge pin has an axis substantially parallel to the axis of the shackle bolt 24. Accordingly, the two piece clamp assembly 40 operates as a jaw in order to move between an open position and a closed position, such as shown in FIG. 4.

As best seen in FIGS. 5A, 5B and 6, the face ring 42 includes an aperture 50 which aligns with an aperture 52 in the back ring 44. The apertures 50 and 52 will align when the clamp assembly 40 is in the closed position in order to form an opening in the two piece clamp assembly. The two piece clamp assembly 40 receives a retainer pin 54 in the opening. When installed, the retainer pin 54 is parallel to the shackle bolt 24.

A mechanism is provided to prevent the retainer pin from being fully removed from the assembly 40. In one preferred embodiment, a retainer clip 56, which may be a split ring, is received around the retainer pin 54. As will be seen, the retainer pin is initially inserted into the face ring 42 and then, the retainer clip 56 is installed. Thereafter, the retainer pin 54 cannot be removed from the face ring 42 without removing the retainer clip 56.

A portion of the aperture 50 in the face ring 42 has a larger diameter than the diameter of a retainer clip 56. Accordingly, as seen in FIG. 5B, the retainer pin 54 may be partially retracted with the retainer clip 56 within the aperture 50 so that the back ring may be moved and the clamp assembly opened and removed.

The retainer pin 54 includes a transverse recess 58 which aligns with an opening in the back face 44 of the two piece clamp assembly 40.

The transverse recess 58 receives a lock pin 60 in order to retain the retainer pin 54 in the two piece clamp assembly 40. Once installed, a flexible bail 62 holds the lock pin 60 in the clamp assembly 40 so that the retainer pin 54 may not be axially retracted.

An alternate method to retain the retainer pin in the two piece clamp assembly 40 would include the use of a cotter pin 60'.

In order to install and secure the shackle, the shackle bolt 24 is sequentially inserted through the pair of openings 18 and 20 in the opposed legs of the shackle until the shackle head rests against one leg while the circumferential groove 30 is visible and accessible. The two piece clamp assembly 40 is then moved while in an open position around the shackle bolt 24. The two piece clamp assembly 40 is positioned and then moved to the closed position over the circumferential groove 30 in the shackle bolt 24 so that the clamp assembly 40 resides in the circumferential groove 30. The face ring 42 and the back ring 44 are moved by rotating about the hinge pin 46.

Once in the closed position, a retainer pin 54 is inserted through the opening in the two piece clamp assembly 40 in order to secure the two piece clamp assembly in a secure, closed position. A lock pin 60 is inserted through an opening in the two piece clamp assembly 40 to prevent retraction of the retainer pin 54. The lock pin may include a flexible bail. Alternately, a cotter pin 60' is inserted to prevent retraction of the retainer pin 54.

The reverse procedure is performed in order to disassemble the shackle securing apparatus.

Figure 7A:
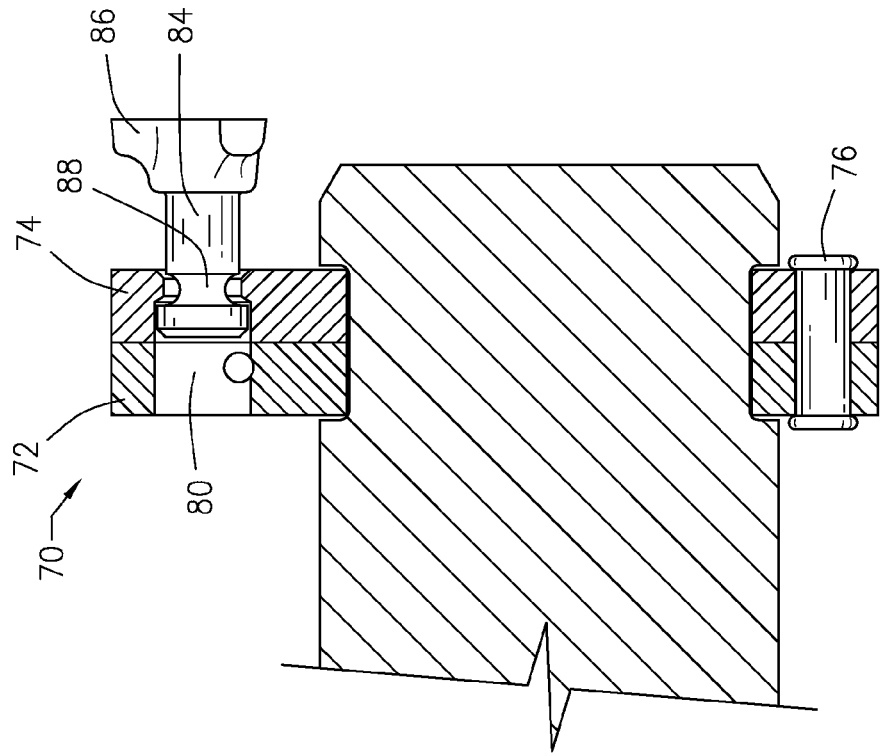
FIGS. 7A and 7B are sectional views of alternate positions of an alternate preferred embodiment of the present invention constructed in accordance with the present invention.
Figure 7B:
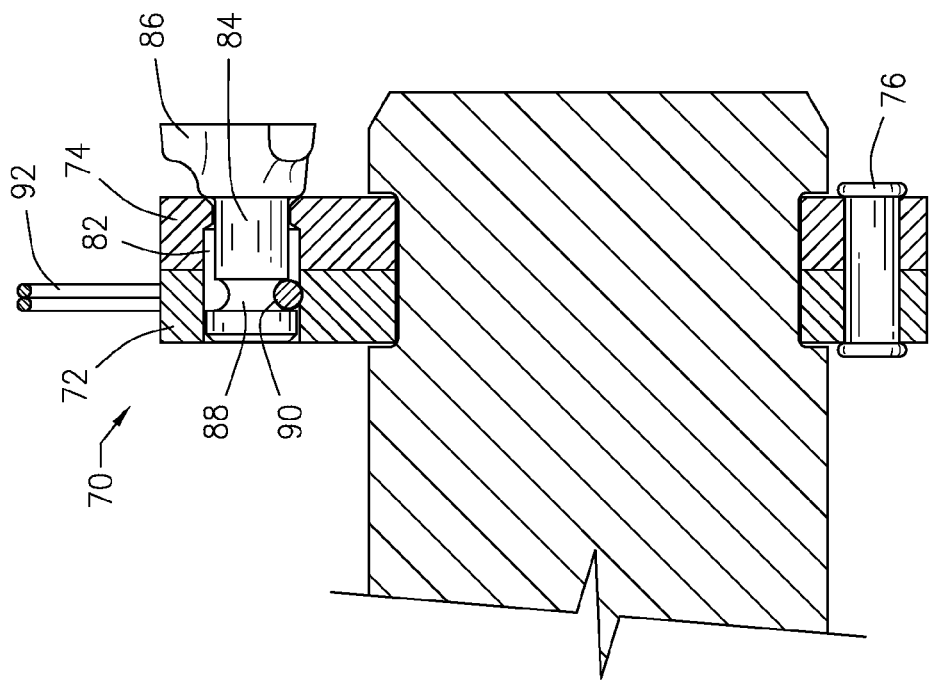

FIGS. 7A and 7B are sectional views of an alternate embodiment of the present invention. A shackle having a body 12 and a pair of opposed clevis ears or legs would be utilized as previously described. A two piece clamp assembly 70 includes an arcuate face element or ring 72 and an arcuate back element or ring 74. The face ring 72 and the back ring 74 are hingedly connected at one end with a hinge pin 76. The hinge pin has an axis substantially parallel to the axis of the shackle bolt 24. Accordingly, the two piece clamp assembly 70 operates as a jaw in order to move between an open position and a closed position.

The face ring 72 includes an aperture 80 which aligns with an aperture 82 in the back ring 74. The apertures 80 and 82 will align with each other when the clamp assembly 70 is in the closed position in order to form an opening in the two-piece clamp assembly. When in the closed position, the two-piece clamp assembly 70 receives a retainer pin 84 in the opening. When installed, the retainer pin 84 is parallel to the shackle bolt 24.

A mechanism is provided to prevent the retainer pin 84 from being fully removed from the assembly 70. In the embodiment in FIGS. 7A and 7B, the retainer pin 84 includes an enlarged head 86 on one end. On an opposed end, the retainer pin 84 includes an enlarged end larger than the shaft of the retainer pin 84.

A portion of the aperture 82 in the face ring has a larger diameter than the diameter of the enlarged end. As seen in FIG. 7B, the retainer pin 84 may be partially retracted with the enlarged end retracted into the aperture 82. This will permit disassembly but the pin 84 may not be fully retracted from the aperture 82.

The retainer pin 84 includes a transverse recess 88 which aligns with an opening in the back face 74 of the two-piece clamp assembly 70. The transverse recess 88 receives a lock pin 90, seen in FIG. 7A, in order to retain the retainer pin 84 in the two-piece clamp assembly 70. Once installed, a flexible bail 92 holds the lock pin 90 in the clamp assembly 70 so that the retainer pin 84 may not be axially retracted. Alternatively, a cotter pin 60' may be employed to retain the retainer pin 84 in the closed position of the two piece assembly.

The present invention is easily installed and is easily removable using small hand tools only.

Whereas, the devices and methods have been described in relation to the drawings and claims, it should be understood that other and further modifications, apart from those shown or suggested herein, may be made within the spirit and scope of this invention.

What is claimed is:

1. A method to secure a shackle, which method comprises the steps of:
    inserting a shackle bolt having a head at one end and a circumferential groove near an opposed end through a pair of openings in opposed legs of said shackle;
    installing a two piece clamp assembly around said shackle bolt in said circumferential groove including separating a face ring and a back ring of said two piece clamp assembly by rotating about a hinge pin and moving to a closed position by closing said face ring and said back ring by said hinge pin;
    inserting a retainer pin through an opening in said two piece clamp assembly in order to secure said two piece clamp assembly in said closed position; and
    inserting a lock pin through an opening in said two piece clamp assembly and through a transverse recess in said retainer pin to retain said retainer pin.

2. A method as set forth in claim 1 wherein said steps are performed in reverse order to disassemble said shackle.

3. A method as set forth in claim 1 including the additional step of installing a retainer clip around said retainer pin before moving said two piece clamp assembly to said closed position.

4. A method to secure a shackle, which method comprises:
    inserting a shackle bolt having a head at one end and an opposed end through a pair of openings in opposed legs of said shackle;
    installing a two-piece clamp assembly around said shackle bolt at said opposed end including separating a back ring and a face ring of said two-piece clamp assembly by rotating about a hinge pin and moving to a closed position including closing said face ring and said back ring by rotating about said hinge pin;
    inserting a retainer pin through an opening in said two-piece clamp assembly so that the retainer pin is parallel to the shackle bolt in order to secure said two-piece clamp assembly in said closed position.

5. A method as set forth in claim 4 including the additional step of installing a retainer clip around said retainer pin for moving said two-piece clamp assembly to said closed position.

6. A method as set forth in claim 4 wherein said two-piece clamp assembly is installed around said shackle bolt in a circumferential groove near said opposed end.

* * * * *